United States Patent
Garner et al.

(10) Patent No.: US 11,938,900 B2
(45) Date of Patent: Mar. 26, 2024

(54) AUTO-IMMOBILIZATION OF MACHINES CAPABLE OF MOVING

(71) Applicant: Aeris Communications, Inc., San Jose, CA (US)

(72) Inventors: Michael Garner, Richardson, TX (US); Bruno Rossi, Santa Clara, CA (US); Muhammad Masoom, Santa Clara, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 17/892,341

(22) Filed: Aug. 22, 2022

(65) Prior Publication Data
US 2022/0396241 A1 Dec. 15, 2022

Related U.S. Application Data

(62) Division of application No. 16/100,433, filed on Aug. 10, 2018, now Pat. No. 11,440,505.
(Continued)

(51) Int. Cl.
*B60R 25/00* (2013.01)
*B60R 25/042* (2013.01)
(Continued)

(52) U.S. Cl.
CPC ............ *B60R 25/30* (2013.01); *B60R 25/042* (2013.01); *B60R 25/045* (2013.01); *B60R 25/10* (2013.01);
(Continued)

(58) Field of Classification Search
CPC ....... B60R 25/30; B60R 25/045; B60R 25/10; B60R 25/102; B60R 25/042; B60R 16/0207; B60R 2025/0415
See application file for complete search history.

(56) References Cited

U.S. PATENT DOCUMENTS

| 6,606,562 B1 | 8/2003 | Gifford |
| 7,034,683 B2 | 4/2006 | Ghazarian |

(Continued)

FOREIGN PATENT DOCUMENTS

WO 2014172322 A1 10/2014

OTHER PUBLICATIONS

IBlue, IBlue Immobilizer, Jun. 5, 2018, Retrieved from https://iblue.eu/immobilizer/.
(Continued)

*Primary Examiner* — Ian Jen
(74) *Attorney, Agent, or Firm* — Shih IP Law Group, PLLC

(57) ABSTRACT

In one example embodiment, a computer-implemented method and system for immobilization of machines capable of moving are disclosed. The method for immobilization of machines capable of moving includes detecting an event by a tracking device; providing one or more rules to evaluate the detected event; evaluating the detected event using the one or more rules; and triggering an action type based on the outcome of the evaluation. The system for immobilization of machines capable of moving includes a machine capable of moving, a tracking device including at least one processor and logic, a starter relay and a fuel pump relay, wherein the tracking device detects an event; evaluates the detected event using one or more rules provided to evaluate the detected event; and triggers an action type based on the outcome of the evaluation.

12 Claims, 9 Drawing Sheets

Related U.S. Application Data

(60) Provisional application No. 62/544,233, filed on Aug. 11, 2017.

(51) Int. Cl.
  *B60R 25/045* (2013.01)
  *B60R 25/10* (2013.01)
  *B60R 25/102* (2013.01)
  *B60R 25/30* (2013.01)
  *B60R 16/02* (2006.01)
  *B60R 25/04* (2013.01)

(52) U.S. Cl.
  CPC ........ *B60R 25/102* (2013.01); *B60R 16/0207* (2013.01); *B60R 2025/0415* (2013.01)

(56) References Cited

U.S. PATENT DOCUMENTS

| | | |
|---|---|---|
| 7,129,852 B2 | 10/2006 | Aslund |
| 7,650,864 B2 | 1/2010 | Hassan |
| 9,406,086 B2 | 8/2016 | Jackson |
| 9,818,151 B2 | 11/2017 | Ehrman |
| 9,939,809 B1 | 4/2018 | Obaidi |
| 2002/0089434 A1* | 7/2002 | Ghazarian .............. G06Q 10/08 340/988 |
| 2002/0186144 A1 | 12/2002 | Meunier |
| 2003/0151507 A1 | 8/2003 | Andre |
| 2015/0175125 A1* | 6/2015 | Morgan ................. B60R 25/00 340/426.11 |
| 2017/0101006 A1 | 4/2017 | Devries |
| 2017/0200329 A1 | 7/2017 | Rajakondala |

OTHER PUBLICATIONS

NTA, Vehicle Disabling Systems, NorthAmerican Transportation Association, Jun. 5, 2018, Retrieved from http://www.ntassoc.com/uploads/FileLinks/be1d5f8106d64e0198d776625e0f31aa/Vehicle%20Disabling%20Systems.pdf.

Automate, Automate Vehicle Anti-Theft System Installation and Operation Guide, Dec. 31, 2004, Retrieved from http://www.directeddealers.com/manuals/ig/automate/N640M_05-04.pdf.

International Search Report and Written Opinion from International Application No. PCT/US18/46189 dated Oct. 22, 2018.

* cited by examiner

100

AUTO-IMMOBILIZATION OF MACHINES CAPABLE OF MOVING

CROSS-REFERENCE TO RELATED APPLICATIONS

This application is a Divisional of U.S. application Ser. No. 16/100,433, filed Aug. 10, 2018, which claims priority under 35 USC 119(e) to U.S. Provisional Application Ser. No. 62/544,233, entitled "AUTO-IMMOBILIZATION OF MOVING MACHINES", filed on Aug. 11, 2017, which is incorporated herein by reference in its entirety.

FIELD OF THE INVENTION

The embodiments described herein relate generally to machines capable of moving and more particularly to automobiles installed with telematics tracking devices operating on cellular networks.

BACKGROUND

In many Internet-of-Things (IoT)/Machine-to-Machine (M2M) solutions, particularly running on machines capable of moving, for example, vehicles, it may be useful for any vehicle tracking solution to provide a method for immobilizing the machine in the event that certain events occur, such as theft or hijacking of the machine, unauthorized removal of the tracking device, or owner non-compliance with lease or purchase terms.

SUMMARY

In one example embodiment, a computer implemented method for immobilization of a machine capable of moving is disclosed. The method includes detecting an event by a tracking device; providing one or more rules to evaluate the detected event; evaluating the detected event using the one or more rules; and triggering an action type based on the outcome of the evaluation.

In another example embodiment, a system for immobilization of a machine capable of moving is disclosed. The system includes a machine capable of moving, a tracking device including at least one processor and logic, a starter relay and a fuel pump relay, wherein the tracking device detects an event; evaluates the detected event using one or more rules provided to evaluate the detected event; and triggers an action type based on the outcome of the evaluation.

In an example embodiment, a non-transitory computer-readable medium having executable instructions for immobilization of a machine capable of moving is disclosed. The non-transitory computer-readable medium having executable instructions stored therein that, when executed, cause one or more processors corresponding to a system comprising a tracking device to perform operations comprising: detect an event by the tracking device; provide one or more rules to evaluate the detected event; evaluate the detected event using the one or more rules; and trigger an action type based on the outcome of the evaluation.

In yet another example embodiment, the method for immobilization of a machine capable of moving includes detecting an event; providing at least one programmable input to the feedback loop; and providing at least one programmable output based on logic for control of relays, wherein the relays comprise any one or more of the starter relay and the fuel pump relay.

In an example embodiment, the system for immobilization of a machine capable of moving includes a machine capable of moving, a tracking device including hardware, e.g., at least one processor and logic, a starter relay and a fuel pump relay and a feedback loop, wherein the tracking device detects an event; provides at least one programmable input to the feedback loop; and provides at least one programmable output based on logic for control of relays, wherein the relays comprise any one or more of the starter relay and the fuel pump relay.

DETAILED DESCRIPTION

The embodiments described herein relate generally to machines capable of moving and more particularly to the immobilization of machines capable of moving, automatically according to logic, such as, for example, automatic immobilization of machines when the tracking device installed in the machines capable of moving is removed. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown, but is to be accorded the widest scope consistent with the principles and features described herein.

In many Internet-of-Things (IoT)/Machine-to-Machine (M2M) solutions, particularly running on machines capable of moving, for example, vehicles, it may be useful to a party having an interest in the vehicle, such as the owner, lessor, or financing party, to either manually or automatically immobilize the machines capable of moving when certain events occur, such as theft or hijacking of the machine, non-compliance by an owner with contract terms, or unauthorized removal of tracking device installed in the machine capable of moving.

Frequently, machines capable of moving have some type of location tracking device, for example, GPS tracking system, installed in them to enable the owner, lessor, fleet manager, finance company or other interested person to find the machine. Because thieves or persons who wish to avoid compliance with the terms of finance or rental contract are aware of this, they will often try to find the tracking device and try to remove it so that they can steal the machine or avoid complying with their contract and escape being tracked. A common feature of location tracking devices is the installation of relays connected to the tracking device which are wired into the electrical ignition and/or fuel pump assemblies in the vehicle to allow the vehicle to be immobilized remotely.

Figure 1:
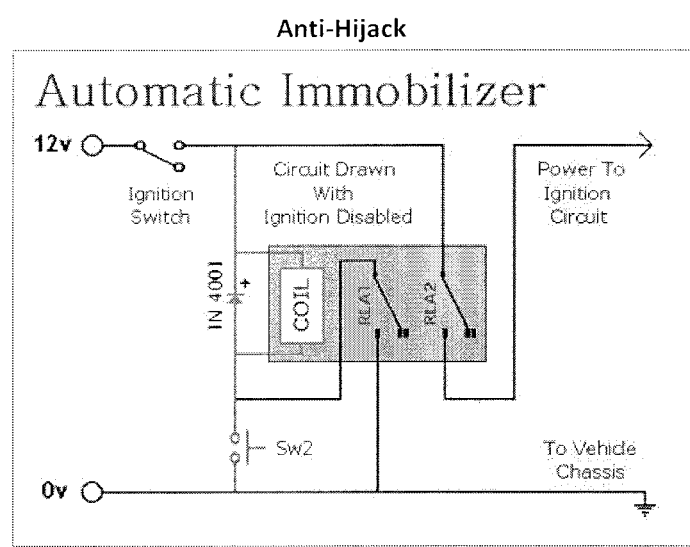
FIG. 1 is an overview diagram for the anti-hijacking system 100 used as an immobilization technique.

An anti-hijacking solution illustrated in FIG. 1 uses an electrical switch that has to be in a closed, or engaged, position for the machine capable of moving to start. If the tracking device has been unplugged or removed, the electrical switch is not engaged and as a result the machine capable of moving will not start. However, this solution is easy to override since the operator may reconnect the tracking device in order to start the vehicle. Also, operators with understanding of ignition wiring may be able to bypass the switch so that it is rendered ineffective.

Figure 2:
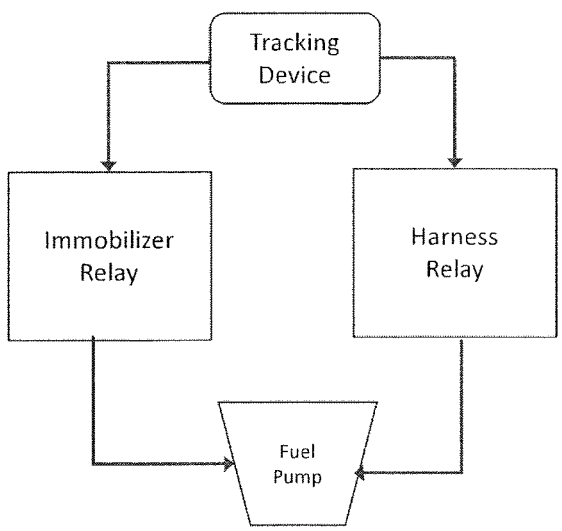
FIG. 2 is an overview diagram for the dual sequence relays system 200 used as an immobilization technique.

A solution using dual sequence relays is illustrated in FIG. 2. This solution uses a pair of sequenced relays so one relay can disable fuel remotely if the other relay is disconnected from device. However, installation of this solution may only support one immobilization method, for example, cutting off the flow of fuel, which could result in a machine stopping abruptly in dangerous space, for example, on railroad tracks.

Persons, including owners, fleet managers, or rental companies who have an interest in a machine capable of moving, whether a truck, personal vehicle or other piece of equipment, have a major concern about recovery of machines that are stolen or in situations where the owner, lessor or operator is not complying with the terms of a contract, such as payment terms or obligation to keep the machine in a specific geographic location. Thieves or persons who want to avoid complying with contracts may remove the tracking device and prevent discovery of the location of the machine. Once the device is removed, the party with the interest in the machine has no means to either immobilize the machine to prevent it from continuing to leave the area, or to locate the machine.

There are a number of common methods currently in use to address this concern, but each presents various problems. One problem arises when it is not possible to verify if the tracking device is actually unplugged, resulting in a false positive. In another common method, a starter interrupt is used to immobilize on demand, e.g., operator initiated, but since the signal only prevents the machine from being started again once it is turned off, the risk of property loss is not sufficiently reduced, since the absconding party can continue to operate and move the machine until the fuel tank is empty or may have understanding of ignition wiring and hence may be able to bypass the switch so that it is rendered ineffective.

In another common method, a command is sent to interrupt the flow of fuel and thereby immobilize the machine, which can create a safety risk if precautions are not taken to ensure that the machine is in a safe place, such as by using automatic immobilization commands when logic detects the presence of certain conditions. In solutions that immobilize the machine when the tracking device is disconnected or removed, the absconding party can frustrate discovery of the location and recovery of the asset by continually unplugging the device, moving the machine, and plugging the device back in briefly to start it again since the machines immobilized using this technique return to normal working mode as soon as the device is plugged back in.

Embodiments of the design described herein present a unique combination of hardware design and system logic to provide a remotely-operated secure solution for vehicle immobilization that is automatic and eliminates the shortcomings of the existing methods described above.

The initial application of the solution may provide a rental or leasing company the ability to efficiently recover assets which are financially in default. The operator-requested immobilization capability may ensure that the owner/operator can locate an asset and then immobilize it for immediate recovery. The embodiments presented here extend that capability to additionally or alternatively cause the vehicle to be immobilized if a thief or a third party attempts to remove the tracking device. Once this occurs, even if the device is reinstalled, the vehicle may remain immobilized.

For any vehicle tracking solution that may benefit from an immobilization capability, this design may provide increased security and safety.

Embodiments described herein provide a configuration that improves recovery of stolen vehicles by automatically immobilizing the vehicle when the tracking device is removed, notifying a monitoring system, for example, AerTrak, and the customer that the tracking device has been unplugged, automatically switching the tracking device to immobilize state so that even when it is plugged back in, the vehicle will remain immobilized, implement a verification method to prevent false positives and reduce passenger safety risk due to unexpected device failure causing immobilization when the vehicle is in motion.

Additionally, or alternatively, in an embodiment, the vehicle may be automatically immobilized when the tracking device is removed through application of onboard logic, e.g., logic based rules, that detects vehicle movement and chooses immobilization method based on the finding. If the vehicle is stationary at the time that the device is unplugged or removed, the device will, through electrical connections on its internal circuitry, interrupt the fuel pump relay to stop the flow of fuel and thereby immobilize the vehicle, but if the vehicle is determined, through analysis of sensor data, to be moving, then the device will, through electrical connections on its internal circuitry, instead interrupt the starter relay but not the fuel pump relay and prevent the vehicle from being started again after the next ignition off cycle, thereby preventing immobilization when the vehicle is in motion and reducing passenger safety risk.

After immobilization, the device may notify a monitoring system operating on a computer server that can receive communications over cellular or other wireless channels, for example, AerTrak, of the device disconnection or removal and sending of the immobilization command. The monitoring system may notify the party subscribing to the service that the tracking device has been unplugged. If the device is later reconnected, the device will remain in immobilize mode and prevent connection of the starter relay and starting of the vehicle; if desired, the operator of the monitoring system may send a command to the device from the remote system to move the device out of immobilize mode and allow normal operation, or could direct a technician or other person with physical access to the vehicle to use a reset switch to move the device into normal operating mode.

Figure 3:
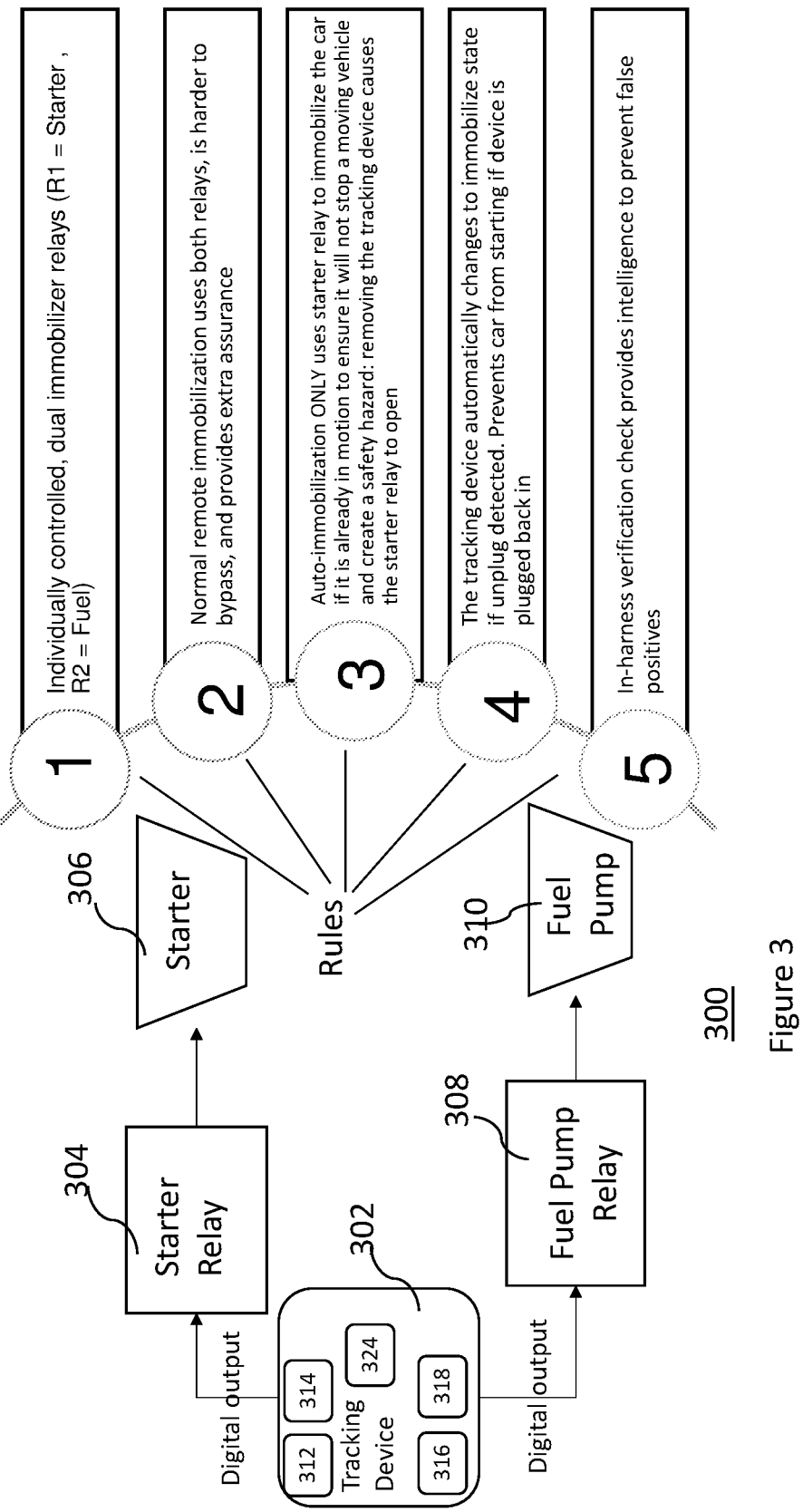
FIG. 3 illustrates an overview of a system 300 used for immobilization of machines capable of moving according to an embodiment described herein.

FIG. 3 illustrates an overview of a system 300 used for immobilization of a machine capable of moving according to an embodiment described herein. The system 300 for immobilizing the machine, e.g., vehicle, includes a tracking device 302 in which a connectivity device 318, for example, a SIM, is installed for cellular and/or wireless connectivity. The tracking device 302 includes hardware, e.g., at least one processor, digital output capability able to drive a relay, e.g., a starter relay, a fuel pump relay etc., and a digital output and input capability to send and receive binary state, e.g., to and from a feedback loop, and logic 316 that provides programmable outputs for control of relays, programmable outputs for feedback loop, programmable input for feedback loop, sensors for detection of motion 312 and detection of or loss of power 314. The system 300 further includes a starter relay 304 which may be a standard 5-wire automotive relay wired for normally open (off) for starter 306; and a fuel pump relay 308 which is a standard 5-wire automotive relay wired for normally close (on) for fuel pump 310. The system 300 thus includes individually controlled, dual immobilizer relays, for example, R1=Starter, R2=Fuel. The tracking device may also be provided with a small internal battery 324 to provide power when the power received from the vehicle power supply is lost. The logic 312 may include one or more rules based on logic to evaluate events detected by the tracking device 302.

The, auto-immobilization according to embodiments described herein may use only starter relay 304 to ensure that it will not stop a moving vehicle, thus preventing safety hazard. The device 302 may automatically disable the starter 306 mechanically via starter relay 304 if unplug event is detected, e.g., removing the tracking device 302 causes the starter relay 304 to open, and switch to immobilize state. The tracking device 302 remains in this immobilize state even when the vehicle is stopped, ignition is turned off or the vehicle is restarted, thereby preventing the vehicle from starting even if the device 302 is plugged back in. The immobilization state of the tracking device 302 once stopped/ignition turned off may also include disabling the fuel pump relay 308 in addition to the starter relay 304.

This control of the relays, starter relay as well as fuel pump relay is accomplished via digital output from the tracking device, e.g., an electrical signal, based on the embedded logic. For example, if a true unplug event is confirmed by the tracking device, the device switches to an immobilize mode, which includes sending digital output by the tracking device to starter relay and fuel pump relay in the form of electrical signals to disable a starter as well as to disable the fuel pump when the tracking device is plugged back in.

Disabling both relays also provide additional assurance, in case the absconding party has an understanding of ignition wiring and hence may be able to bypass the starter relay switch so that it is rendered ineffective. The system described herein provides for remote immobilization through two alternative means. Thus by using both the starter relay 304 and the fuel pump relay 308, the system is harder to bypass, providing greater assurance that one of the methods will effectively immobilize the vehicle.

Even if the person operating the vehicle unplugs the device 302, such as while the vehicle is in motion, and then reconnects the device 302, the device 302 will automatically disable the starter relay 304 and change to an immobilize state upon first being unplugged, meaning that the starter relay 304 will not permit restarting the vehicle even if the device is plugged back in. In addition, the embodiment described herein provides a safety check so that immobilization will not occur in situations where the safety of vehicle occupants or others could be jeopardized.

For safety reasons, when the tracking device is removed, the starter relay 304 is automatically mechanically disabled, since removal of the device 302 causes the starter relay 304 to open. The tracking device switches to immobilize state involving starter relay 304 as well as fuel pump relay 308, e.g., the vehicle will not start once it stops after such illegitimate event is detected and no communication is received from the server. Use of fuel pump relay 308 provides additional assurance that even if someone can override the starter relay interrupt, the additional disablement of fuel pump relay 308 will prevent the machine from running.

In another embodiment, one or more sensors 312 in the device 302 may detect if the vehicle is moving and onboard logic may block any immobilization through the fuel pump relay 308 until the vehicle is no longer moving. The solution may be configured to allow this protective feature to be overridden and to allow an immobilization command to be sent by the server through the request of an authorized monitoring system operator even when the vehicle is moving.

Additionally or alternatively, the device may be programmed to distinguish an event where the device is intentionally unplugged, e.g., loss of power, from the vehicle by an authorized user, from an event involving unauthorized removal of the device 302. For unplug situations, authorized users, such as those legitimately disconnecting the device 302 and/or vehicle battery for vehicle servicing or for extended non-use of the solution, may securely access the monitoring server and enter a notification that the device/power supply has been unplugged. Upon this notification, the server may communicate with the tracking device 302 and direct it, through onboard logic on the device 302, to permit normal operation of the vehicle even with the device 302 disconnected or when reconnected. However, when the tracking device 302 is removed by a person who does not have authorized access to the server, such as a thief or a party avoiding compliance with the terms of a contract, the server will not receive notification that the disconnection was permitted, and the tracking device 302 will proceed to operate normally and immobilize the vehicle.

In an embodiment, the system may be additionally provided with in-harness verification check as described below in the description accompanying FIG. 4, providing intelligence to prevent false positives.

Figure 4:
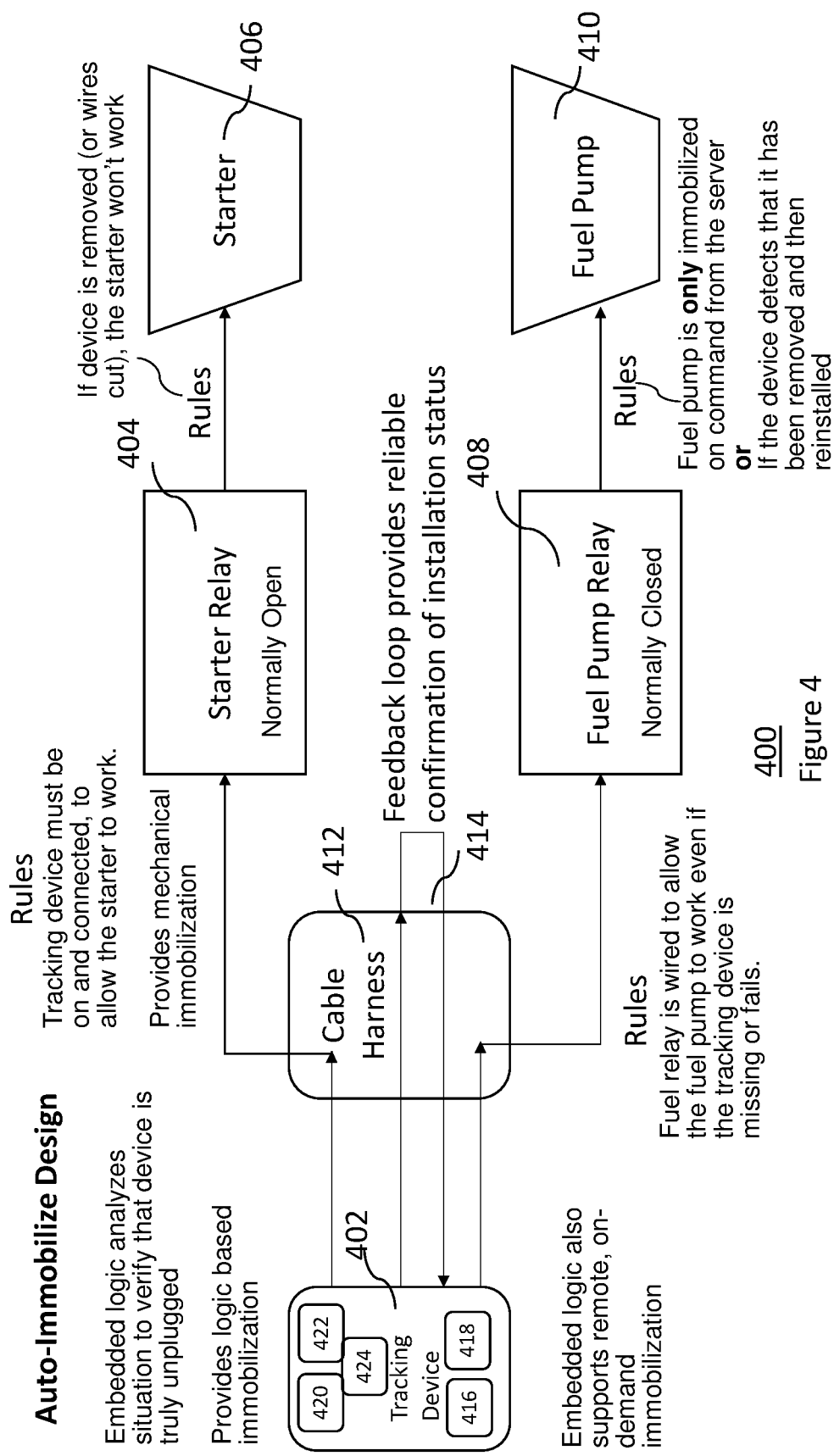
FIG. 4 illustrates an overview of a system 400 used for immobilization of machines capable of moving according to an embodiment described herein.

FIG. 4 illustrates an overview of a system 400 used for immobilization of machines capable of moving according to an embodiment described herein. The system 400 for automatically immobilizing the vehicle includes a tracking device 402 in which a connectivity device 418, for example, a SIM, is installed for cellular and/or wireless connectivity. The tracking device 402 includes hardware, e.g., at least one processor, digital output capability able to drive a relay, e.g., a starter relay, a fuel pump relay etc., and a digital output and input capability to send and receive binary state, e.g., to and from a feedback loop, and logic 416 that provides programmable outputs for control of relays, programmable outputs for feedback loop, and programmable input for feedback loop, a sensor for detection of motion 420 and detection of or loss of power 422. The system 400 further includes a feedback test loop 414 to allow the tracking device 402 to verify installation; a starter relay 404 which may be a standard 5-wire automotive relay wired for normally open (off); and a fuel pump relay 408 which is a standard 5-wire automotive relay wired for normally close (on). The tracking device may be provided with a small internal battery 424 to provide power when the power received from the vehicle power supply is lost. Embedded logic 416, e.g., logic based rules, in the tracking device analyzes a situation/event to verify that device is truly unplugged and provides logic based immobilization.

The system may additionally include a cable harness 412 that provides a physical connection point to attach the tracking device 402 to the vehicle, included as a feedback test loop 414 to allow the tracking device to verify installation, e.g., verify/confirm an unplug event in case of loss of power to the tracking device 402 or loss of motion of the tracking device 402 as a true unplug event. The feedback loop 414 provides reliable confirmation of installation status or of true unplug/removal of the tracking device 402. When the tracking device 402 is removed from the cable harness 412, the starter relay circuit is not complete as removing the tracking device 402 causes starter relay 404 to open and the starter 406 would not work, resulting in immobilization of the vehicle through interruption of the electrical connection required for operation of the vehicle ignition system as discussed in detail below.

Tracking device 402 provides logic-based immobilization. If the tracking device 402 detects an unplug situation, the embedded logic uses feedback loop 414 to analyze the situation and verify if the tracking device 402 is truly unplugged by sending a signal from the tracking device 402, through the cable harness 412, and back to the tracking device 402. If the signal does not complete this path, then the tracking device 402 will confirm disconnection of the tracking device 402 or an unplug event. When the tracking device 402 is detected to be unplugged, the tracking device 402 switches to immobilization mode which will disable the starter relay 404, which will prevent the starter 406 from working, even if the tracking device 402 is plugged back in. This switching to the immobilization mode of the tracking device 402 prevents the starter relay 404 to enable starter 406 when re-plugged. This disconnect/disabling of the starter relay 404 does not depend on whether or not the vehicle is moving. The fuel pump relay 408 may be wired to allow the fuel pump 410 to work even if the tracking device 402 is missing (removed) or fails while the vehicle is in motion, in which case the vehicle may keep running but may not restart once stopped.

This control of the relays, starter relay as well as fuel pump relay, is accomplished via digital output from the tracking device, e.g., an electrical signal, based on the embedded logic. For example, if a true unplug event is confirmed by the tracking device, then switch the device to immobilize mode, which includes sending digital output by the tracking device to starter relay and fuel pump relay in the form of electrical signals to disable a starter as well as to disable the fuel pump when the tracking device is plugged back in.

However, once the tracking device 402 switches to the immobilization mode, the fuel pump relay 408 may also be disconnected once the machine in motion stops/ignition turned off, and is attempted to restart or the tracking device 402 is re-plugged, to provide additional assurance against overriding starter relay disconnect, which may be possible by persons knowledgeable in working of a machine capable of moving. In such case, the fuel pump relay 408, will stop the flow of fuel from the fuel pump 410 to the engine, and result in the immobilization of the vehicle.

If the tracking device 402 through feedback loop 414 confirms that the loss of power or loss of motion event was not a true unplug event, it does not switch to the immobilization mode and hence the starter relay circuit will complete once the original conditions, e.g., power, of the tracking device 402 are restored.

In another embodiment, the one or more onboard motion sensors 422 may detect whether the vehicle is in motion, and the onboard/embedded logic will choose the correct immobilization method. In the event that the one or more sensors 414 do not detect vehicle motion, then the device 402 will interrupt the fuel pump relay 408, which will stop the flow of fuel from the fuel pump 410 to the engine, and result in the immobilization of the vehicle.

Thus, the system described herein provides automatic logic-based immobilization in addition to automatic mechanical immobilization with protection against false positives and safety measure against stopping the vehicle, if the vehicle is already in motion, and preventing a potentially hazardous situation.

In addition to automatic immobilization through application of logic onboard the tracking device 402, an embodiment may also provide a system and method for an authorized user or operator of the monitoring system to send a command to the tracking device 402 for remote immobilization.

However, when the device detects that it was truly unplugged, it automatically switches to immobilize mode/state, and even when it is plugged back in, it stays in the immobilize mode/state, exactly as if the operator had immobilized it using a user interface, through application of logic onboard the tracking device 402, without any immobilize command from the operator/server.

Figure 5:
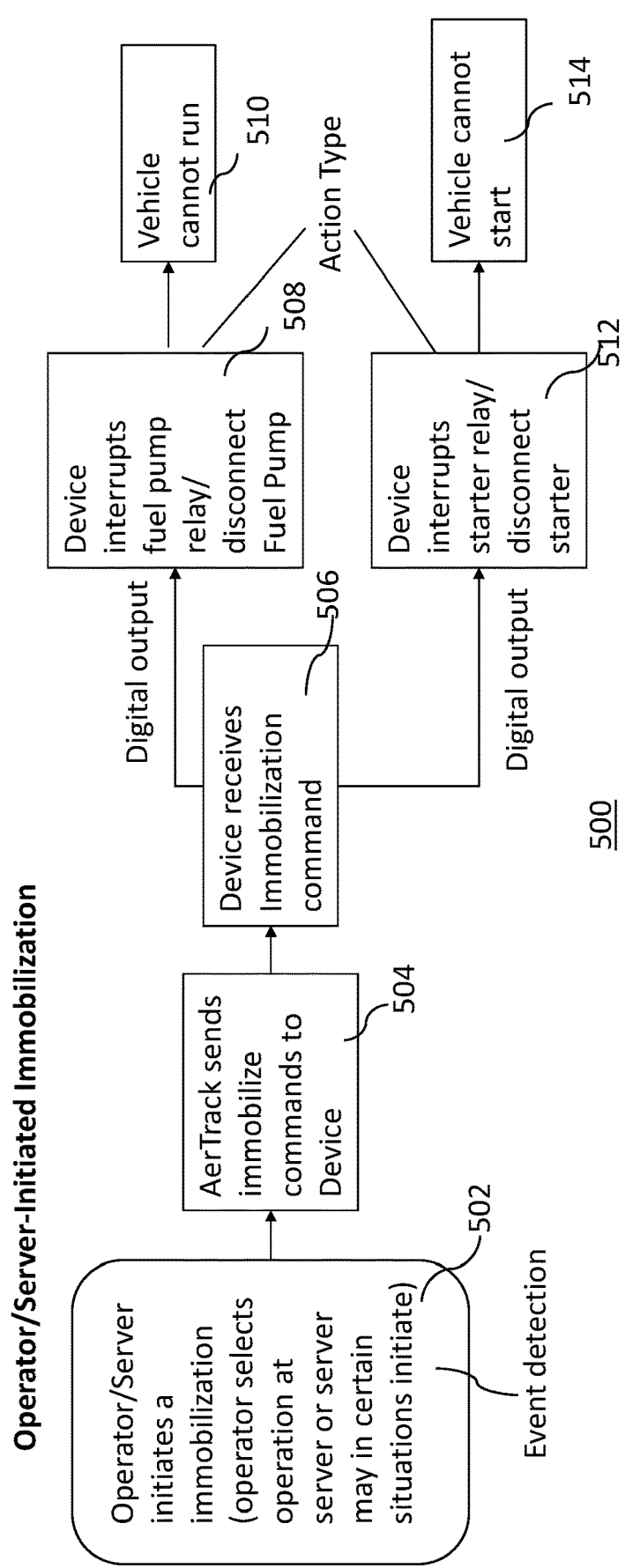
FIG. 5 illustrates an overview of a process flow 500 used for operator-requested immobilization of machines capable of moving according to an embodiment described herein.

FIG. 5 illustrates an overview of a process flow 500 used for an operator/server-initiated immobilization of machines capable of moving according to an embodiment described herein. The method for operator/server-initiated remote immobilization 500 includes the action of an authorized operator, through selection of an operation in the system (button push, mouse click) via step 502, to send a command to the tracking device by the remote monitoring system to switch the device to immobilize mode via step 504. In an embodiment, a server may in certain situations initiate remote immobilization that would work similar to the operator-initiated remote immobilization. Once the immobilize command is received by the device via step 506, the device switches to immobilization mode and disconnects the fuel pump via step 508 and will disconnect the starter via step 512, both of which will prevent the vehicle from being started again once turned off via step 514 and run via step 510 once turned off. The fuel pump may be disconnected by interrupting the fuel pump relay and the starter may be disconnected by interrupting the starter relay.

This control of the relays, starter relay as well as fuel pump relay, is accomplished via digital output from the tracking device, e.g., an electrical signal, based on the embedded logic. For example, if a true unplug event is confirmed by the tracking device, then switch the device to immobilize mode, which includes sending digital output by the tracking device to starter relay and fuel pump relay in the form of electrical signals to disable a starter as well as to disable the fuel pump when the tracking device is plugged back in.

For example, if the tracking device is removed from the machine capable of moving, removal of the tracking device will cause the starter relay to open resulting in automatic mechanical immobilization involving the starter relay once the ignition is turned off. This may then be combined with operator/server initiated switching of the tracking device to an immobilize state. In such situation, once the tracking device is switched to immobilize state, even when the tracking device is plugged back, the machine capable of moving will not start due to disabled starter relay and/or run due to disabled fuel pump relay.

In an embodiment, in certain cases, the operator may also be able to interrupt the fuel pump relay via step 508, which would cause the vehicle to stop immediately due to loss of fuel via step 510 and also render the vehicle unable to restart both due to loss of fuel and disconnection of the starter relay via step 514.

Figure 6:
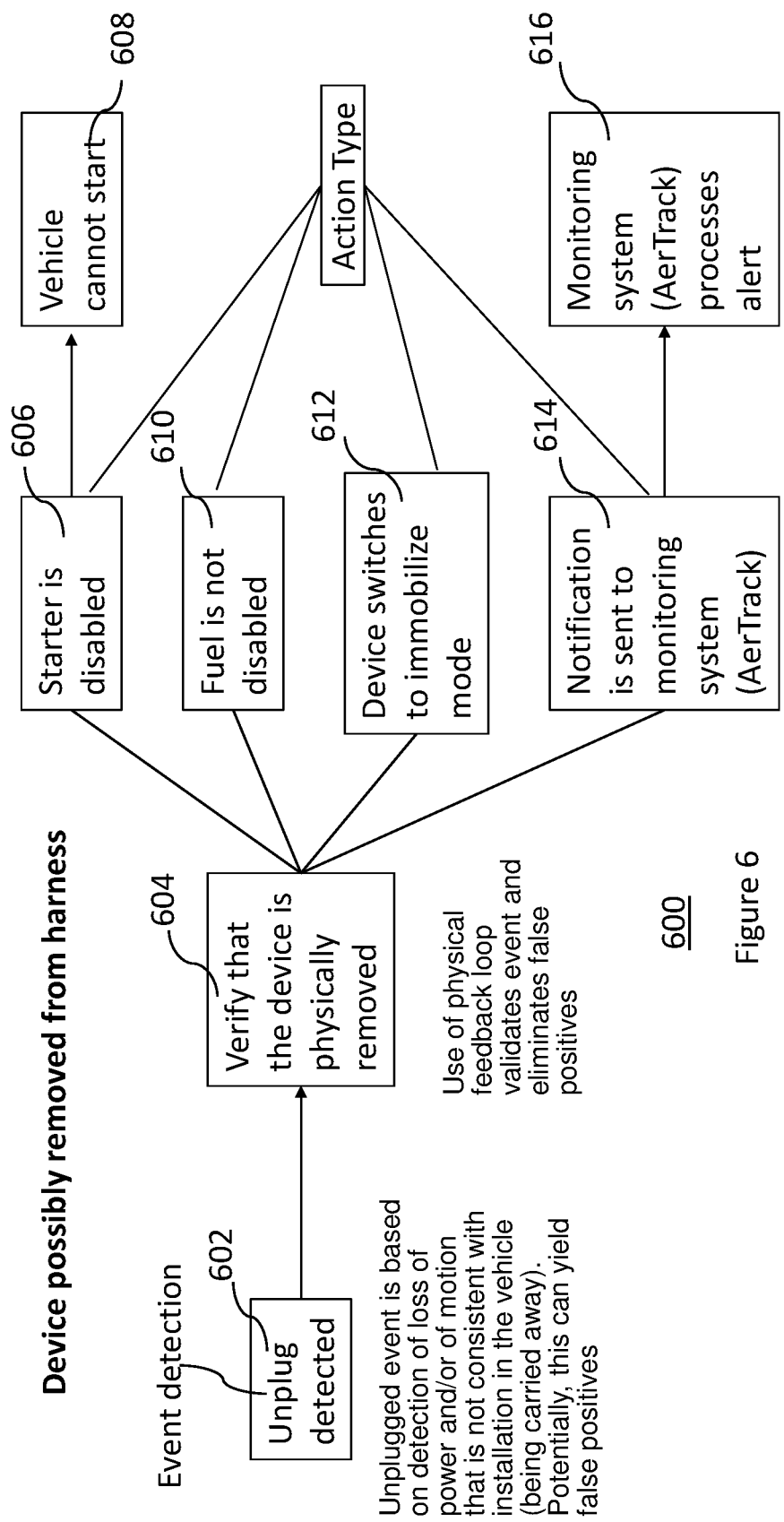
FIG. 6 illustrates an overview of a process flow 600 used for auto-immobilization of machines capable of moving according to an embodiment described herein.

FIG. 6 illustrates an overview of a process flow 600 used for auto-immobilization of a machine capable of moving when the device is disconnected from the wiring harness or removed from the vehicle according to an embodiment described herein. When a device detects that it has been unplugged or removed via step 602, the device uses the feedback loop via step 604 to verify that the device is no longer connected to the cable harness. Upon verification, the device will automatically move to the immobilize state via step 612. Detection of an unplugged event 602 is generally based on loss of power and/or motion of the tracking device. This may result in false positives, since loss of power may be experienced due to various reasons such as unplugging the vehicle battery for servicing or extended break in use etc., unplugging the tracking device for servicing, or failure of the tracking device. Similarly, loss of motion may be experienced due to device failure, extended break in use etc. The physical feedback loop may be used to verify/validate an unplug event, e.g., loss of power/motion event as a true unplug event, via step 604 and eliminate false positives. The physical feedback loop may include a cable harness which when tampered with, e.g., wires cut to remove the tracking device, or the device removed from the cable harness as shown in FIG. 4, will result in switching the tracking device to automatic immobilization state.

When the device detects that it is unplugged or has lost power, it uses the logic that confirms the unplug event. If the device is truly removed, the starter relay is disconnected via step 606 automatically via mechanical disconnect since removing/unplugging the device causes starter relay to open. This will allow the vehicle to continue to receive fuel via step 610, preventing a moving vehicle from stopping in an unsafe situation. If the unplug event or loss of power event is confirmed as a true unplug event via step 604, the device switches to immobilization mode/state, which prevents the vehicle from being restarted after the next ignition off via step 608. The device thus switches to immobilization mode via step 612 and may also send a message through the onboard cellular or other wireless communication device, such as a SIM, to the remote computer-based monitoring system, for example, AerTrack, notifying the system via step 614 that the device was disconnected and has been switched to immobilize mode. The remote server processes the alert via step 616 and, as configured by the customer or operator of the system, notifies other users of the event.

The confirmation that the device has been truly unplugged, step 604, may be obtained by the device using the feedback loop as illustrated in FIG. 4 and described above in the description accompanying FIG. 4. The device may verify/confirm if the tracking device is truly unplugged by sending a signal from the tracking device, through the cable harness, and back to the tracking device. If the signal does not complete this path, then the tracking device will confirm disconnection. For example, the tracking device sends a signal on an output line of the device and then, via the loopback serial, reads the signal on an input line. If a signal is detected, then the device knows that the unplug event (usually loss of power) is false and the switch to immobilization mode will not occur. If the signal is missing, then the device has confirmation that it has actually been unplugged.

Whether or not the vehicle is moving, removal of the tracking device will disconnect the starter relay mechanically via step 606, which will prevent the starter from working, once the ignition is turned off. However, when the tracking devices confirms the true unplug event by verification using the feedback loop, it will switch to immobilization state via step 612 which will disable starter relay thereby preventing restarting the vehicle even when the tracking device is plugged back in. The immobilization state of the tracking device once stopped/ignition turned off may also include disabling the fuel pump relay in addition to disabling the starter relay. Disabling both relays also provide additional assurance, in case the absconding party has an understanding of ignition wiring and hence may be able to bypass the starter relay switch so that it is rendered ineffective.

This control of the relays, starter relay as well as fuel pump relay, is accomplished via digital output from the tracking device, e.g., an electrical signal, based on the embedded logic. For example, if a true unplug event is confirmed by the tracking device, then switch the device to immobilize mode, which includes sending digital output by the tracking device to starter relay and fuel pump relay in the form of electrical signals to disable a starter as well as to disable the fuel pump when the tracking device is plugged back in.

The system and method described herein provides for remote immobilization through two alternative means. Thus by using the starter relay and the fuel pump relay, the system is harder to bypass, providing greater assurance that one of the methods will effectively immobilize the vehicle.

Once the device automatically switches itself to immobilize mode, it may send a notification to the tracking system via step 616 as described above. It may remain in this immobilize state until directed by the tracking/monitoring system to return to normal which may be initiated by a command from the server where the server may communicate with the tracking device and direct it, through onboard logic on the device, to permit normal operation of the vehicle even with the device disconnected or when reconnected.

Although any unplug event may cause the starter relay to open and hence disable the starter, if the tracking device through feedback loop does not receive confirmation that the loss of power or loss of motion event was a true unplug event, it does not switch to the immobilization mode and hence the starter relay circuit will complete when the ignition is turned by closing the starter relay. Thus, if it is not confirmed that the device is truly unplugged, then the unplug or the loss of power event may be a false positive or perhaps the result of normal vehicle service, e.g., battery disconnect etc. In this case, the tracking device may not take any further action and restoration of normal conditions will result in normal operation of the machine.

In an embodiment, the onboard motion sensors may additionally detect whether the vehicle is in motion, and the onboard logic may choose the correct immobilization method based on the detection.

Figure 7:
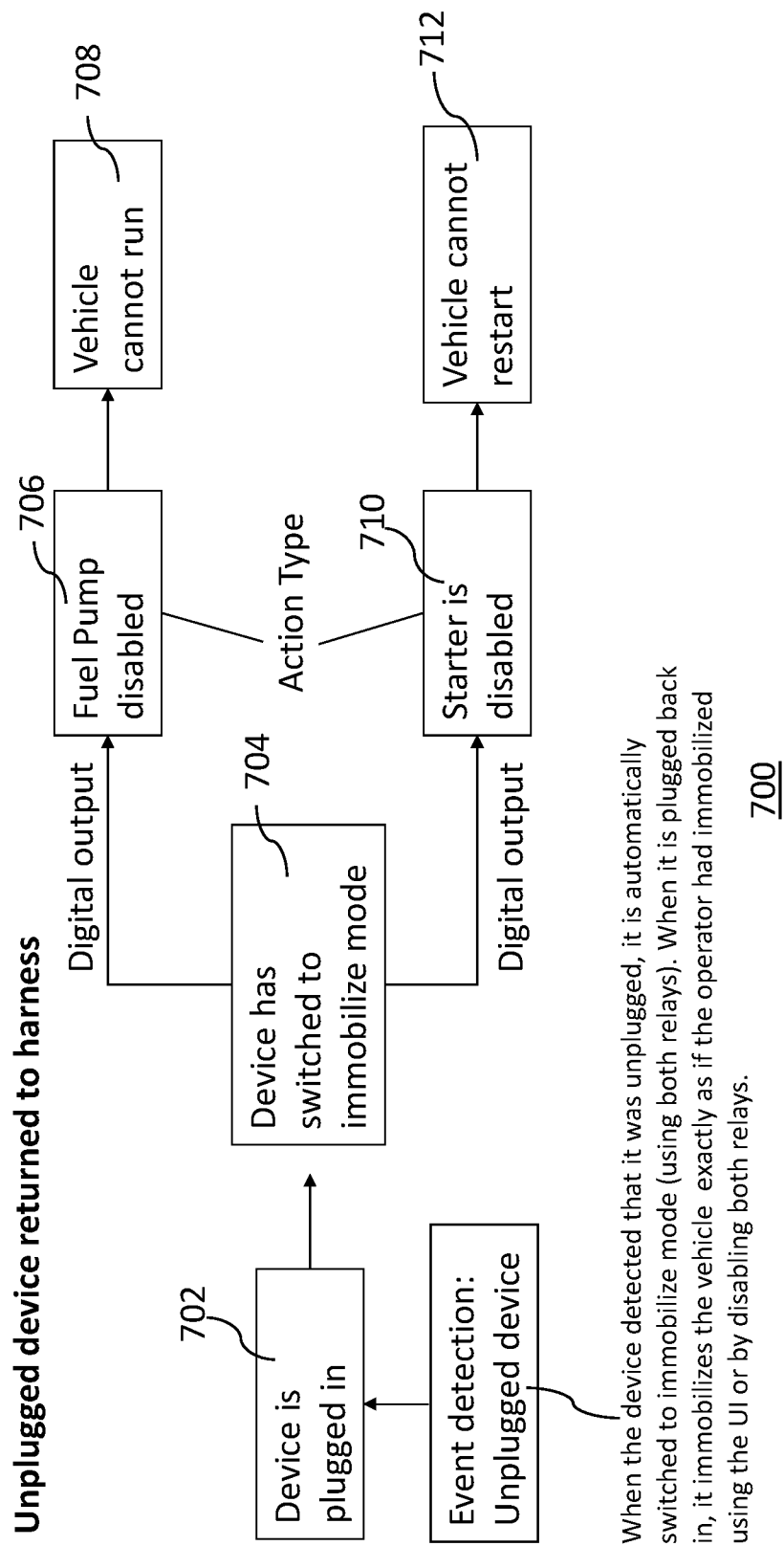
FIG. 7 illustrates an overview of a process flow 700 used for auto-immobilization of machines capable of moving according to an embodiment described herein.

FIG. 7 illustrates an overview of a process flow 700 used for auto-immobilization of machine capable of moving according to an embodiment described herein. In an exemplary scenario, a device that was disconnected without authorization and has subsequently been placed automatically in immobilize mode may be reconnected with the in-vehicle wiring harness via step 702. The logic on the device will continue to detect that immobilize mode is active, and the circuitry onboard the device will continue to interrupt the starter relay via step 710 and fuel pump relay via step 706, preventing the car from starting and operating normally. The vehicle may not restart as illustrated by 712 since the starter is disabled via step 710 and the vehicle may not run as illustrated by 708 since the fuel pump is disabled via step 706 once stopped/ignition turned off, providing additional assurance against an absconding party who may have understanding of ignition wiring and hence may be able to bypass the switch so that it is rendered ineffective.

This control of the relays, starter relay as well as fuel pump relay, is accomplished via digital output from the tracking device, e.g., an electrical signal, based on the embedded logic. For example, if a true unplug event is confirmed by the tracking device, then switch the device to immobilize mode, which includes sending digital output by the tracking device to starter relay and fuel pump relay in the form of electrical signals to disable a starter as well as to disable the fuel pump when the tracking device is plugged back in.

Thus, when the device detects that it was truly unplugged, it automatically switches to immobilize mode/state, and even when it is plugged back in, it stays in the immobilize mode/state, exactly as if the operator had immobilized it using a user interface, through application of logic onboard the tracking device, without any immobilize command from the operator/server.

Figure 8:
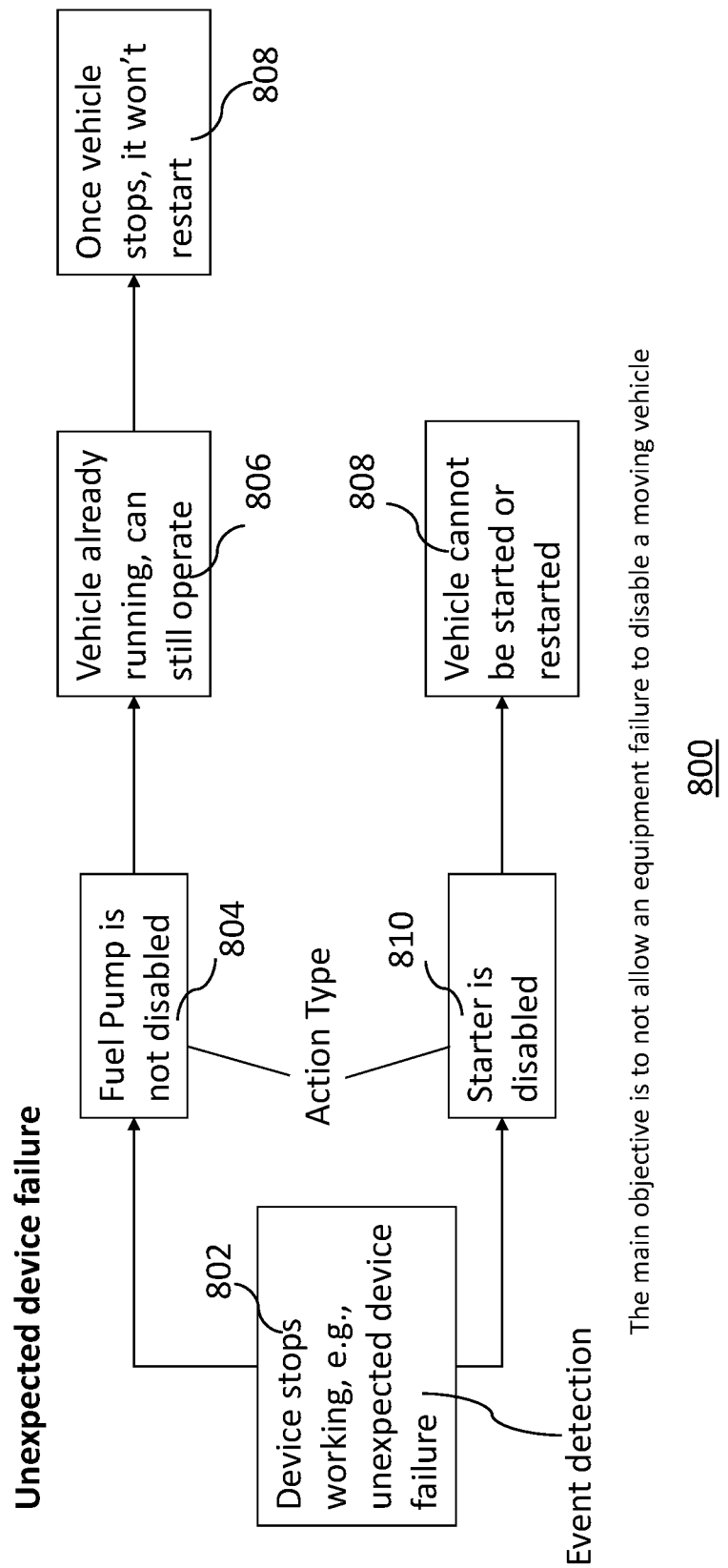
FIG. 8 illustrates an overview of a process flow 800 used for auto-immobilization of machines capable of moving according to an embodiment described herein.

FIG. 8 illustrates an overview of a process flow 800 used for auto-immobilization of machine capable of moving according to an embodiment described herein. In an exemplary scenario, a device may fail unexpectedly, such as due to failure or overload of internal circuitry as illustrated by 802. If the tracking device is in the critical path of vehicle operation, the device failure may cause a vehicle to be immobilized unintentionally in potentially hazardous situations. Therefore, to avoid accidental immobilization of a vehicle in motion, the system may only immobilize by disabling the starter as removing device causes starter relay to open via step 810 and not disabling the fuel pump as illustrated by step 804. In this case, the vehicle may remain drivable as illustrated by step 806 until the vehicle is stopped and engine turned off. And because the starter is disabled via step 810, the vehicle cannot be started or restarted, once it stops/ignition turned off. This embodiment thus prevents disabling a vehicle in motion due to equipment failure and preventing a potentially hazardous situation.

Figure 9:
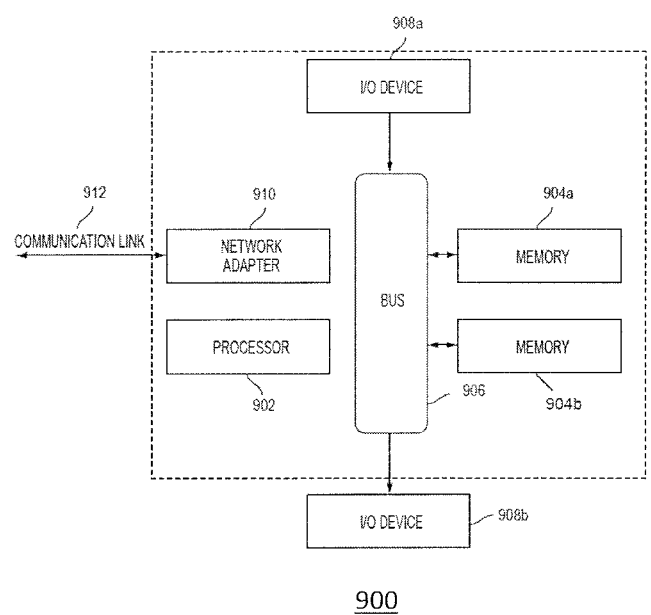
FIG. 9 illustrates a data processing system 900 suitable for storing the computer program product and/or executing program code relating to immobilization of machines capable of moving in accordance with an embodiment described herein.

FIG. 9 illustrates a data processing system 900 suitable for storing the computer program product and/or executing program code in accordance with an embodiment of the present invention. The data processing system 900 includes a processor 902 coupled to memory elements 904a-b through a system bus 906. In other embodiments, the data processing system 900 may include more than one processor and each processor may be coupled directly or indirectly to one or more memory elements through a system bus.

Memory elements 904a-b can include local memory employed during actual execution of the program code, bulk storage, and cache memories that provide temporary storage of at least some program code in order to reduce the number of times the code must be retrieved from bulk storage during execution. As shown, input/output or I/O devices 908a-b (including, but not limited to, keyboards, displays, pointing devices, etc.) are coupled to the data processing system 900. I/O devices 908a-b may be coupled to the data processing system 900 directly or indirectly through intervening I/O controllers (not shown).

In FIG. 9, a network adapter 910 is coupled to the data processing system 902 to enable data processing system 902 to become coupled to other data processing systems or remote printers or storage devices through communication link 912. Communication link 912 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk—read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "cellular network" includes networks using one or more communication architectures or methods, including but not limited to: wireless network, Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for immobilization of a machine capable of moving, the method comprising:
   detecting an event by a tracking device;
   detecting movement of the machine;
   providing at least one programmable input to the feedback loop;
   providing at least one programmable output based on logic for control of relays, wherein the relays comprise any one or more of starter relay and fuel pump relay;
   evaluating the detected event and the detected movement of the machine; and
   triggering an action type based on the outcome of the evaluation, wherein the action type comprises:
      disabling fuel pump of the machine capable of moving if the machine is not moving,
      disabling starter of the machine capable of moving if the machine is already in motion, and
      disabling fuel pump and starter of the machine capable of moving even if the tracking device is reconnected.

2. The method of claim 1, wherein the event comprises any one or more of: loss of power to the tracking device, restoration of power to the tracking device, loss of motion of the tracking device and failure of the tracking device.

3. The method of claim 1, wherein the programmable input to a feedback loop comprises sending a signal through the feedback loop to verify that the loss of power to the tracking device is due to removal of the tracking device.

4. The method of claim 1, wherein the feedback loop comprises a cable harness.

5. The method of claim 1, wherein the at least one programmable output depends on the verification that the loss of power to the tracking device is due to removal of the tracking device.

6. The method of claim 1, wherein the at least one programmable output comprises any one or more of: interrupt the fuel pump relay, interrupt the starter relay, and notify a monitoring system.

7. A system for immobilization of a machine capable of moving, the system comprising a machine capable of moving, a tracking device including at least one processor and logic, a starter relay and a fuel pump relay and a feedback loop, wherein the tracking device
   detects an event;
   detects movement of the machine;
   provides at least one programmable input to the feedback loop;
   provides at least one programmable output based on logic for control of relays, wherein the relays comprise any one or more of the starter relay and the fuel pump relay; and
   the at least one processor
      evaluates the detected event and the detected movement of the machine; and
      triggers an action type based on the outcome of the evaluation, wherein the action type comprises:
         disabling fuel pump of the machine capable of moving if the machine is not moving,
         disabling starter of the machine capable of moving if the machine is already in motion, and
         disabling fuel pump and starter of the machine capable of moving even if the tracking device is reconnected.

8. The system of claim 7, wherein the event comprises any one or more of: loss of power to the tracking device, restoration of power to the tracking device, loss of motion of the tracking device and failure of the tracking device.

9. The system of claim 7, wherein the feedback loop allows for verification that the loss of power to the tracking device is due to removal of the tracking device.

10. The system of claim 7, wherein the feedback loop comprises a cable harness.

11. The system of claim 7, wherein the at least one programmable output depends on the verification that the loss of power to the tracking device is due to removal of the tracking device.

12. The system of claim 7, wherein the at least one programmable output comprises any one or more of: interrupt the fuel pump relay, interrupt the starter relay, and notify a monitoring system.

* * * * *